United States Patent
Pignataro et al.

(10) Patent No.: US 11,563,622 B2
(45) Date of Patent: Jan. 24, 2023

(54) EVENT-TRIGGERED ADAPTIVENESS TO TOGGLE TIMERS/MODES IN FAST-DETECTION OAM PROTOCOLS

(71) Applicant: Cisco Technology, Inc., San Jose, CA (US)

(72) Inventors: Carlos M. Pignataro, Cary, NC (US); Nagendra Kumar Nainar, Morrisville, NC (US); Jaganbabu Rajamanickam, Kanata (CA); Madhan Sankaranarayanan, Chennai (IN); Prakash Jain, Fremont, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/070,648

(22) Filed: Oct. 14, 2020

(65) Prior Publication Data
US 2022/0116261 A1    Apr. 14, 2022

(51) Int. Cl.
*H04L 41/06* (2022.01)
*H04L 43/0805* (2022.01)

(52) U.S. Cl.
CPC .......... *H04L 41/06* (2013.01); *H04L 43/0805* (2013.01)

(58) Field of Classification Search
CPC ............................. H04L 41/06; H04L 43/0805
USPC ........................................................ 370/241
See application file for complete search history.

(56) References Cited

U.S. PATENT DOCUMENTS

| | | | | |
|---|---|---|---|---|
| 7,940,678 B2 * | 5/2011 | Tan | ......................... | H04L 45/02 370/242 |
| 8,082,340 B2 * | 12/2011 | Filsfils | .................. | H04L 41/069 709/224 |
| 9,258,234 B1 * | 2/2016 | Addepalli | ............... | H04L 47/12 |
| 9,769,017 B1 * | 9/2017 | Jose | ..................... | H04L 41/0695 |
| 2010/0149992 A1 * | 6/2010 | Tan | ......................... | H04L 45/02 370/242 |
| 2017/0041209 A1 * | 2/2017 | Joshi | ....................... | H04L 45/02 |
| 2017/0195209 A1 * | 7/2017 | Singh | .................. | H04L 41/5003 |

(Continued)

OTHER PUBLICATIONS

Juniper Networks, Inc., "Understanding BFD for BGP", https://www.juniper.net/documentation/en_US/junos/topics/concept/bgp-bfd-understanding.html, Feb. 10, 2020, 2 pages.

Juniper Networks, Inc., "[M/MX/T] Troubleshooting Checklist—BFD", https://kb.juniper.net/InfoCenter/index? page=content&id=KB26746#BFD_flap, Oct. 7, 2020, 8 pages.

(Continued)

*Primary Examiner* — James E Springer
*Assistant Examiner* — Patrick F Ngankam
(74) *Attorney, Agent, or Firm* — Edell, Shapiro & Finnan, LLC

(57) ABSTRACT

A method is performed by a node configured to implement an Operation, Administration, and Maintenance (OAM) protocol for rapid link failure detection. The node receives peer OAM packets sent by a peer node over a link at a peer periodic interval. While in a first mode of the OAM protocol, the node determines whether the peer node is reachable based on the peer OAM packets, sends OAM packets to the peer node at a periodic interval to indicate to the peer node that the node is reachable, and responsive to detecting a critical condition of the node that impairs the sending the OAM packets, transitions to a second mode of the OAM protocol. While in the second mode, the node adds, to the peer OAM packets, a code to indicate the critical condition, and reflects the peer OAM packets with the code back to the peer node.

20 Claims, 7 Drawing Sheets

(56) References Cited

U.S. PATENT DOCUMENTS

2020/0162337 A1    5/2020   Jain et al.
2020/0389383 A1    12/2020  Vasseur et al.

OTHER PUBLICATIONS

Arista Networks, Inc., "Security Advisory", Support Overview, Version: 1.0, https://www.arista.com/en/support/advisoriesnotices/security-advisories/5721-security-advisory-36, Aug. 6, 2018, 6 pages.
Cisco, "Chapter: Bidirectional Forwarding Detection Configuration of Deterministic Hardware Offload", https://www.cisco.com/c/en/us/td/docs/ios-xml/ios/iproute_bfd/configuration/xe-3s/asr903/irb-xe-3s-asr903-book/ifb-bfd-offload.html, Jan. 8, 2020, 4 pages.
Cisco, "Bidirectional Forwarding Detection Configuration of Deterministic Hardware Offload", downloaded Oct. 14, 2020, 4 pages.
Cisco Systems, Inc., "Bidirectional Forwarding Detection", downloaded Oct. 14, 2020, 50 pages.

* cited by examiner

EVENT-TRIGGERED ADAPTIVENESS TO TOGGLE TIMERS/MODES IN FAST-DETECTION OAM PROTOCOLS

TECHNICAL FIELD

The present disclosure relates to operations, administration and management (OAM) protocols.

BACKGROUND

In a network, a bidirectional forwarding detection (BFD) protocol (referred to as simply "BFD") may be used to detect network reachability failures between peer nodes in the network on behalf of higher level routing protocols. The routing protocols, such as Open Shortest Path First (OSPF)/Intermediate System to Intermediate System (ISIS), and the like, use BFD to detect peer reachability failures quickly, and then take alternate paths to minimize any traffic loss in the network. The peer nodes exchange BFD "Hellos" in millisecond intervals to detect the reachability failures quickly. Unfortunately, BFD can give false alarms, i.e., indicate peer reachability failures, even when reachability is sound. The false alarms may occur when a peer node cannot timely service is local BFD timers that trigger sending of the BFD Hellos due to reasons unrelated to reachability between the peer nodes. The BFD false alarms can trigger what is referred to as "churn" in the overlaying routing protocols, which should be avoided.

DESCRIPTION OF EXAMPLE EMBODIMENTS

Overview

A method is performed by a node configured to implement an Operation, Administration, and Maintenance (OAM) protocol for rapid link failure detection with respect to a peer node. The node receives peer OAM packets sent by the peer node over a link at a peer periodic interval. While in a first mode of the OAM protocol, the node determines whether the peer node is reachable based on the peer OAM packets, sends OAM packets to the peer node at a periodic interval to indicate to the peer node that the node is reachable, and responsive to detecting a critical condition of the node that impairs the sending the OAM packets, transitions to a second mode of the OAM protocol. While in the second mode, the node adds, to the peer OAM packets, a code to indicate the critical condition, and reflects the peer OAM packets with the code back to the peer node.

Example Embodiments

Figure 1:
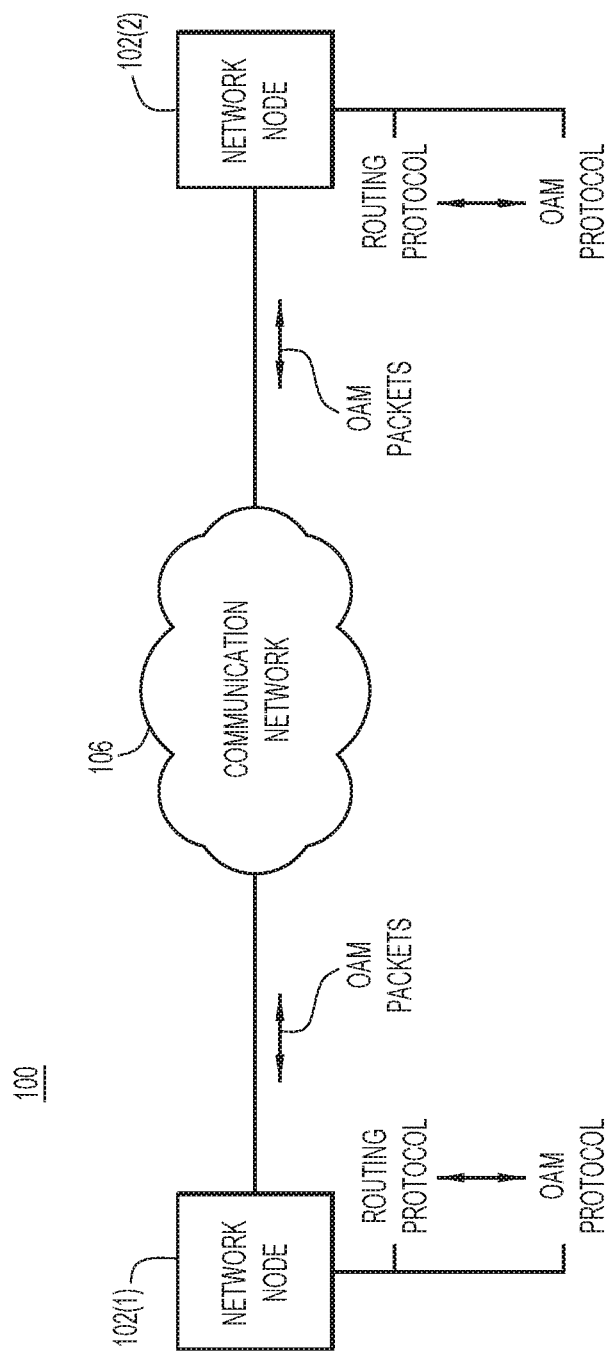
FIG. 1 is a block diagram of a network environment in which embodiments directed to an improved fast detecting OAM protocol (referred to as simply an "improved OAM protocol") may be implemented, according to an example embodiment.

With reference to FIG. 1, there is shown a block diagram of an example network environment 100 in which an improved OAM protocol according to embodiments presented herein may be implemented. Network environment 100 includes a first network node 102(1), a second network node 102(2), and a communication network 106 connected to the first and second network nodes. Network nodes 102(1) and 102(2) (collectively referred to as "nodes 102," and individually referred to as a "node 102(1)" or a "node 102(2)") communicate with each other over one or more network/data links through network 106. Network 106 may include one or more wide area networks (WANs), such as the Internet, and one or more local area networks (LANs). Nodes 102 may each include a virtual and/or physical network device, such as network router and/or switch. The example of FIG. 1 shows only 2 nodes. It is understood that, in practice, there are many more nodes connected to network 106 and capable of communicating with each other via the network.

Nodes 102 implement one or more routing protocols to route packets through network 106. Example routing protocols include OSPF, ISIS, and the like. Nodes 102 also implement the improved OAM protocol underlying the routing protocols. The improved OAM protocol includes periodic exchanges of OAM packets between nodes 102, referred to as "peer nodes." The improved OAM protocol may be based on BFD, seamless BFD (SBFD), and a segment routing (SR)-performance management (PM) (SR-PM) protocol extended to include the improvements presented herein. The improved OAM protocol is a network protocol that provides rapid link failure detection with respect to the link(s) connecting the peer nodes. The improved OAM protocol reports link health status, such as detected failures and the like, to the overlaying routing protocols.

By way of example, the improved OAM is described herein in the context of BFD. It is understood that the embodiments apply equally to improvements to OAM protocols other than BFD. BFD detects faults in bidirectional forwarding paths between forwarding engines (i.e., data planes) of the peer nodes. A goal of BFD is to provide low overhead, short-duration detection of failures in the forwarding paths, including the relevant interfaces, data link(s), and, to the extent possible, the forwarding engines/data planes themselves. BFD may rapidly detect peer reachability failures on behalf of the higher-level routing protocols, and reports the reachability failures to the routing protocols.

BFD is based on a "Hello" protocol. Generally, the peer nodes host/execute respective peer BFD sessions and, during the BFD sessions, transmit BFD packets (i.e., BFD "Hello" packets) to each other periodically over the link. When one of the peer nodes (i.e., the receiver) stops receiving the BFD packets from the other peer node (i.e., the sender) for long enough, the receiver declares a reachability failure to the sender. A periodic interval between consecutive transmissions of the BFD packets may be in a range of milliseconds (ms), e.g., 50-150 ms, for example.

Conventional BFD includes several modes, including an asynchronous mode and an echo mode, also referred to as an "echo-reply." When operating in the asynchronous mode, the peer nodes periodically send BFD control packets (referred to simply as "control packets") to one another and, if a number of those packets in a row are not received by the peer over a predetermined time interval, the corresponding BFD session is declared to be down, i.e., a peer reachability failure is declared. This may be referred to as a BFD session "flap."

The echo mode is an adjunct to the asynchronous mode. When the echo mode is active, both the peer nodes continue to transmit the control packets. In addition, one (or both) of the peer nodes (i.e., the sender) transmits a stream of BFD echo packets to the other node (i.e., the receiver). The receiver loops or echoes the echo packets back to the sender through the forwarding path/data plane of the receiver. If a number of echoed packets are not received back at the sender, the BFD session is declared to be down. The echo mode may be enabled on the peer nodes individually or bi-directionally.

As mentioned above, a BFD session can give a false alarm. The false alarm indicates a peer reachability failure, even when reachability is sound. The BFD session may false alarm when a control plane hosting the BFD session in one of the peer nodes cannot timely service BFD timers due to reasons unrelated to actual reachability. Failure to service BFD timers causes the BFD session to flap. A BFD flap unrelated to actual reachability may occur when the node hosting the BFD session experiences a high level of processor and/or memory usage (i.e., a high level of usage) that prevents the node from servicing its local BFD timers in a timely fashion. This can occur when the node executes computation intensive operations for a routing protocol. In another example, a BFD session flap may occur during a redundant switchover (e.g., a stateful switchover (SSO)) of the node hosting the BFD session to a redundant node, and when the node receives a software version upgrade, each of which results in a high level of processor and/or memory loading.

The aforementioned processor/memory hogging conditions are examples of critical conditions or event triggers that are detectable and thus known to the control plane/processor experiencing the critical conditions. The improved OAM (e.g., improved BFD) takes advantage of the fact that the critical conditions are generally discoverable. More specifically, the improved OAM detects critical condition(s) that might result in a false reachability failure detection, and then takes affirmative action to avoid triggering the false reachability failure detection.

Figure 2:
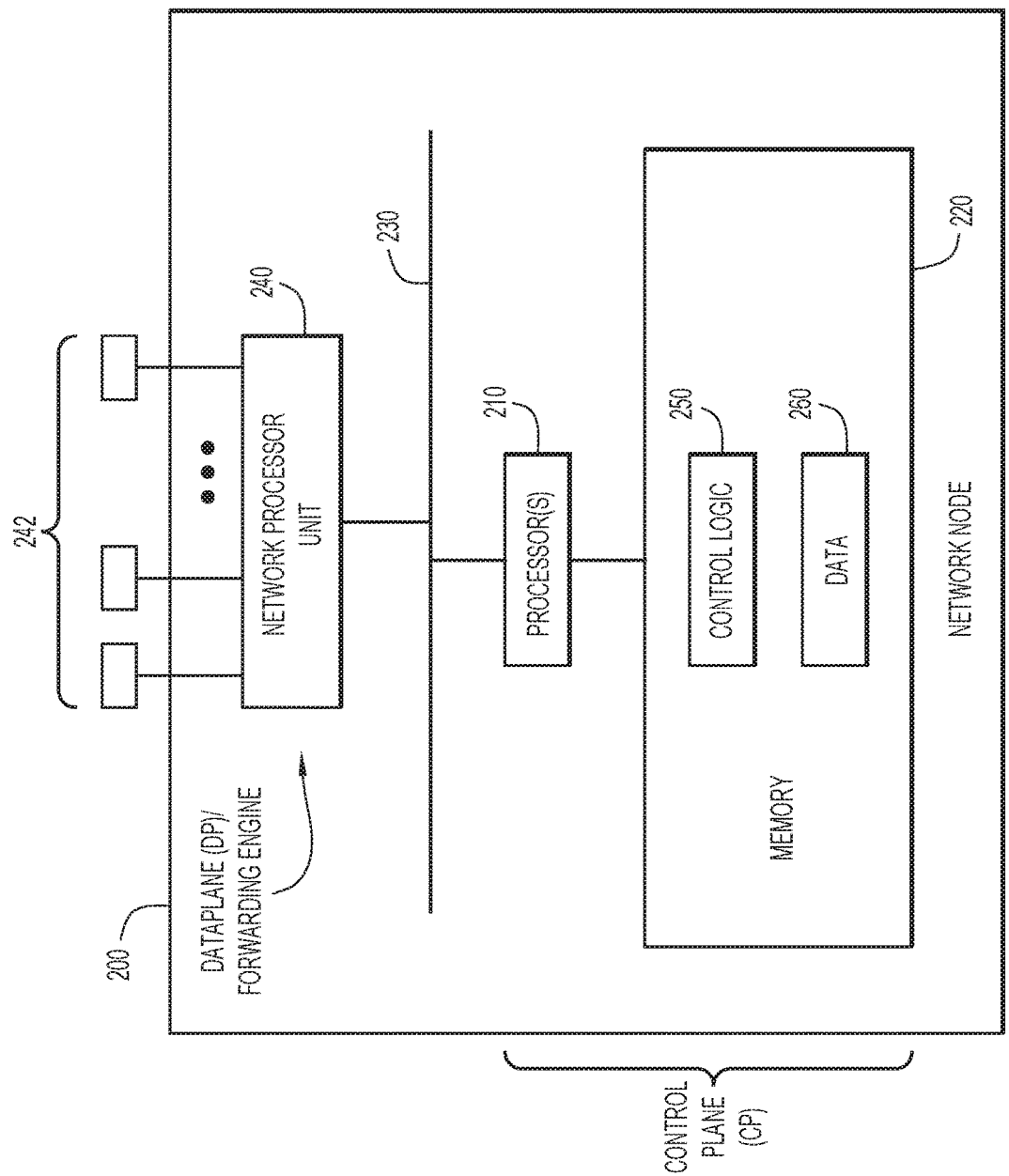
FIG. 2 is a high-level block diagram of a network node configured to implement the improved OAM protocol, according to an example embodiment.

With reference to FIG. 2, there is a high-level block diagram of an example network node 200 configured to implement the improved OAM. Network node 200 is representative of each of nodes 102. The network node 200 includes one or more control processors 210, memory 220, a bus 230 and a network processor unit 240. The control processor 210 may be a microprocessor or microcontroller. Control processors 210 and memory 220 collectively represent a control plane (CP) that implements control plane functions of network node 200, such as routing protocols, and primary functions of the improved OAM protocol. Network processor unit 240 represents a data plane (DP) that implements data plane functions of network node 200, including a forwarding engine to forward packets, and secondary functions of the improved OAM protocol. The network processor unit 240 may include one or more Application Specific Integrated Circuits (ASICs), network equipment linecards, and the like, and facilitates network communications between the node 200 and other network nodes.

There are a plurality of network ports 242 to communicate with a network, e.g., at which the node 200 receives packets and from which the node 200 sends packets into the network. The processor 210 executes instructions associated with software stored in memory 220. Specifically, the memory 220 stores instructions for control logic 250 that, when executed by the processor 210, causes the processor 210 to perform various operations on behalf of the node 200 as described herein. Control logic 250 includes logic for overall control of node 200 and control plane operations, including routing protocols, and the improved OAM protocol. The memory 220 also stores configuration information 260 received from a network controller to configure the network node according to desired network functions. It should be noted that in some embodiments, the control logic 250 may be implemented in the form of firmware implemented by one or more ASICs as part of the network processor unit 240.

The memory 220 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 220 may comprise one or more tangible (non-transitory) computer readable storage media (e.g., a memory device) encoded with software comprising computer executable instructions and when the software is executed (by the processor 210) it is operable to perform certain network node operations described herein.

Memory 220 also includes configuration information 260 used and produced by control logic 250.

Operations of the improved OAM are described below in connection with FIGS. 3 and 4, in the example context of improved BFD.

Figure 3:
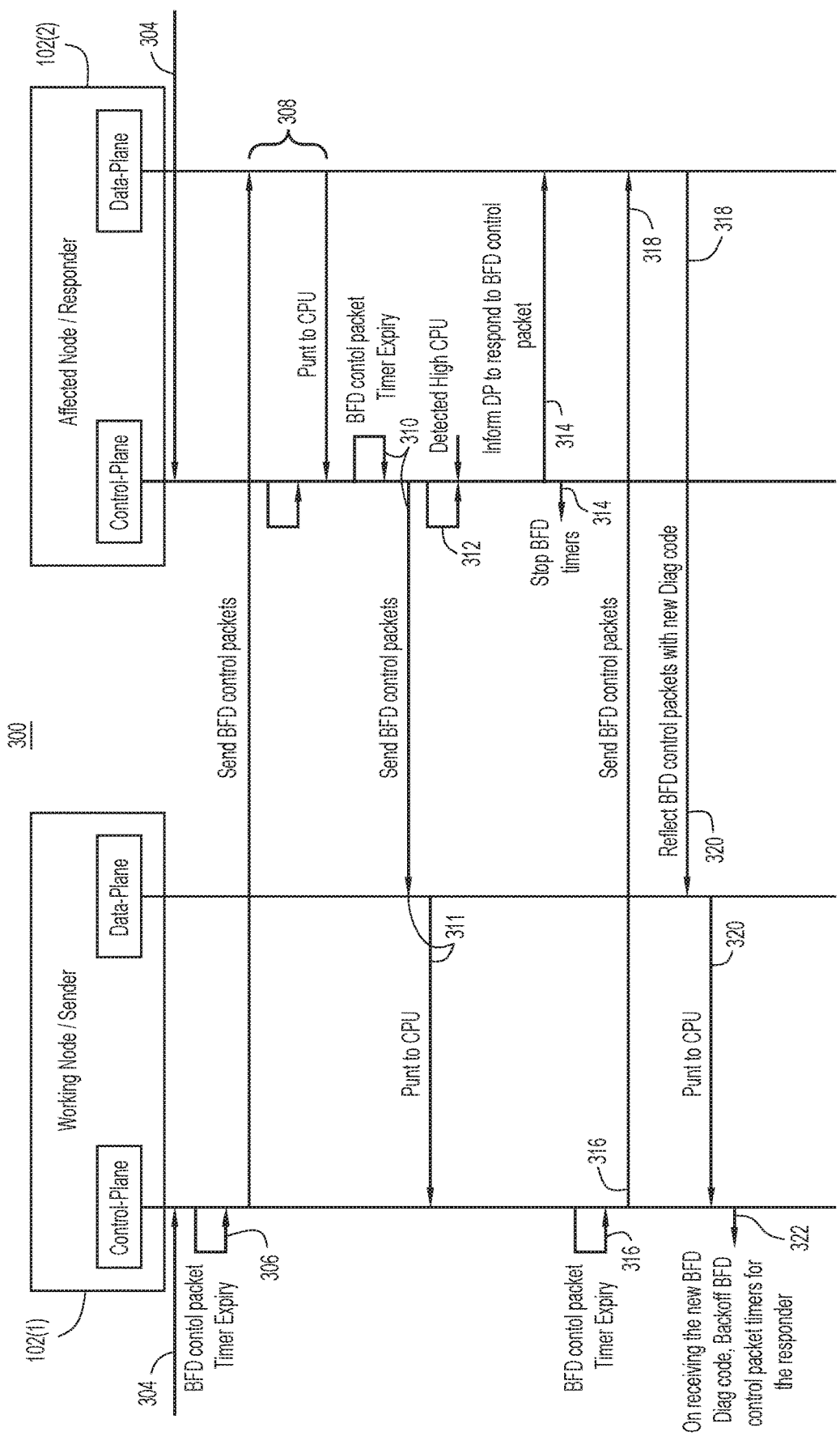
FIG. 3 is a transaction diagram of event trigger-response operations of improved BFD, according to an example embodiment.

With reference to FIG. 3, there is an example transaction diagram 300 of event trigger-response operations of the improved OAM, e.g., improved BFD. Transaction diagram 300 shows BFD operations performed by, and BFD packet exchanges between, peer nodes 102(1) and 102(2). Node 102(1) is referred to as a "working node" or "sender." Node 102(2) is referred to as an "affected node" or "responder." As shown, each node respectively includes a control plane and a data plane separate from the control plane, as described above in connection with FIG. 2.

As mentioned above, the control plane (implemented by the processor or central processing unit (CPU)) implements routing protocols and primary functions of the improved BFD protocol. For example, the control plane implements BFD sessions and associated BFD timers on which the BFD sessions rely. Generally, the BFD timers indicate periodic time intervals, e.g., 50 ms time intervals that are preset. For example, during a BFD session, the BFD timers are repeatedly reset, started, and run to expiry, which indicates that the preset time interval has elapsed. The data plane implements packet forwarding, as well as secondary functions of the improved BFD protocol. In the ensuing description, the control plane and the data plane of the sender are respectively referred to as the "sender control plane" and the "sender data plane." Similarly, the control plane and the data plane of the responder are respectively referred to as the "responder control plane" and the "responder data plane." Also, BFD control packets are referred to simply as "control packets."

Initially, at 304, peer BFD sessions are implemented/hosted by the control planes of the sender and the responder. Initially, the BFD sessions each operate in a normal mode or state, similar to the asynchronous mode of BFD, for example.

At 306, responsive to expiry of the BFD timer at periodic intervals (e.g., every 50 ms) in the sender control plane, the BFD session hosted in the sender control plane (i.e., the sender BFD session) originates and then sends periodic control packets (via the sender dataplane) to the responder to indicate the sender is reachable. Each control packet includes a source address that is an address of the sender, and a destination address that is an address of the responder. Each control packet includes a field for a diagnostic code that indicates whether a critical condition is detected at the sender, as will be described below. At this time, in the absence of such a critical condition, prior to sending the control packet, the sender control plane populates the diagnostic field with a value that indicates no critical condition is present.

At 308, the responder data plane receives the control packets. The responder data plane forwards or "punts" the control packets to the BFD session hosted in the responder control plane (i.e., the responder BFD session). That is, the responder control plane receives the control packets via the responder dataplane. The responder BFD session determines whether the sender is reachable based on the periodic control packets sent by/received from the sender. In an example in which the sender sends its periodic control packets every 50 ms, and a detect multiplier is 3, the responder BFD session may declare that the sender is not reachable when the responder BFD session does not receive multiple control plackets from the sender within 3*50=150 ms. When the responder BFD session determines that the sender is not reachable, the responder BFD session indicates a reachability failure to a higher-level routing protocol. Otherwise, the responder BFD session does not indicate any reachability failure.

At 310, responsive to expiry of the BFD timer at periodic intervals in the responder control plane, the responder BFD session originates and sends periodic control packets to the sender to indicate the responder is reachable. Each control packet includes a source address that is an address of the responder, and destination address that is an address of the sender. Each control packet includes a field for a diagnostic code that indicates whether a critical condition is detected at the responder, as will be described below. At this time, in the absence of such a critical condition, prior to sending the control packet, the responder control plane populates the diagnostic field with a value that indicates no critical condition is present.

At 311, the sender data plane receives the control packet sent by the responder. The sender data plane forwards or "punts" the control packet to the sender BFD session. The sender BFD session determines whether the responder is reachable based on the periodic control packets sent by/received from the responder. When the sender BFD session determines that the sender is not reachable, the BFD session indicates a reachability failure to a higher-level routing protocol. Otherwise, the sender BFD session does not indicate any reachability failure.

Referring again to the responder, in a background operation 312 that is concurrent with operation 310, the responder control plane monitors its own performance, e.g., the performance of local CPU and memory, for one or more critical conditions (also referred to as "critical missions") that might impact or are impacting the timely sending of the control packets responsive to the BFD timer. More generally, operation 312 detects a critical condition of the responder that impairs the responder BFD session, e.g., causes a delay between sending of consecutive control packets that is beyond an acceptable/threshold time interval. Detection of the critical condition represents the "event trigger" mentioned above.

Operation 312 may detect the critical condition when a monitored parameter exceeds a threshold value. Examples of different types of critical conditions that may be detected include, but are not limited to: (i) CPU (i.e., processor) usage/loading above a CPU usage/loading threshold (i.e., a high level of CPU usage); (ii) a high level of memory usage, i.e., memory usage above a memory usage threshold (e.g., a number of memory access per time interval above a threshold, or memory size in use above a threshold); (iii) an SSO; (iv) a routing protocol crash, necessitating routing protocol restart, (v) an extended fast software upgrade (xFSU) or downgrade to control plane software (because when only the control plane is upgraded/downgraded, the peer node should take a mitigating action), and so on. Operation 312 may detect one or more types of critical conditions at any given time.

When operation 312 detects a critical condition, the operation also records information about the critical condition. The information includes a type or cause of the critical condition. Examples types of critical conditions that are possible and may be recorded include, but are not limited to, type=CPU usage, type=memory usage, type=SSO, and so on. Operation 312 maps the type of critical condition that is detected to a corresponding diagnostic code among a number of different/available diagnostic codes to be reported to the sender in a control packet, described below. For example, diagnostic code=first value indicates normal/no critical condition, diagnostic codes>first value indicate a critical condition, diagnostic code=second value indicates the critical condition relates to CPU usage, diagnostic code=third value indicates the critical condition relates to memory usage, and so.

Responsive to detecting the critical condition, at 314, the responder BFD session transitions from the normal mode to a reflector mode or state. In the reflector mode, the responder BFD session performs the following actions. First, the responder BFD session configures the responder data plane for the reflector mode, e.g., by sending reflector mode configuration commands to the responder data plane. More specifically, the BFD session configures the responder data plane to (i) reflect or echo control packets that are received from the sender back to the sender (even when those control packets include a destination address that is the address of the responder, not the sender), without forwarding or punting those control packets to the responder control plane, as is done in the normal mode, and (ii) prior to reflecting the control packets back to the sender, populate each control packet with the diagnostic code (which may overwrite the diagnostic code previously installed in the field by the sender), which indicates a type of critical condition, as established at operation 312.

Second, the responder BFD session stops or disables its local BFD timers. This stops or prevents the responder BFD session from originating and sending the periodic control packets to the sender, as was done in the normal mode. In other words, the responder BFD session halts sending its control packets to the sender. Unlike conventional BFD echo-reply, the reflector mode only reflects sender originated control packets back to the sender, and thus does not also continue to send periodic responder originated control plackets to the sender, as is done in echo-reply. Third, the responder BFD session may report the critical condition to the local routing protocol.

Referring to the sender, at 316, similar to operation 306, unlike the responder, the sender continues to operate in the normal mode to originate and send periodic control packets (populated with the diagnostic code that indicates no critical condition is present) to the responder responsive to expiry of the local BFD timer.

Referring to the responder, at 318, the responder data plane receives the control packets sent by the sender at 316. Without forwarding the control packets received from the sender to the responder control plane, the responder data plane (i) populates each control packet received from the sender with the new diagnostic code established at operation 312 (i.e., overwrites the existing diagnostic code installed at 316 with the new diagnostic code), and (ii) reflects/returns the control packet, populated with the (new) diagnostic code, back to the sender.

Referring to the sender, at 320, the sender data plane receives the reflected control packets sent by the responder, and punts the reflected control packets to the sender control plane.

At 322, the sender control plane/sender BFD session receives the reflected control packets, parses the reflected control packets, and recovers the new diagnostic code from the parsed packets. The sender BFD session determines an action to be taken based on/responsive to that diagnostic code. For example, when the diagnostic code indicates CPU usage or memory usage as the critical condition, the sender BFD session may increase its local BFD timers, i.e., increase the periodic time intervals indicated by the timers. As a result, the sender BFD session may originate and send control packets to the responder less frequently. Alternatively, the sender BFD session may increase the local BFD timers. In addition, the sender may inform client devices associated with the sender node of the critical condition so that the client devices may take any corresponding actions.

In one embodiment, the sender BFD session may remain in the normal mode, e.g., the asynchronous BFD mode, in response to the new diagnostic code (i.e., the critical condition diagnostic code). In this case, each control packet sent by the sender includes the address of the sender as the source address and the address of the responder as the destination address. In another embodiment, the sender BFD session may transition to the BFD echo mode responsive to the critical condition code. In the echo mode, the sender also sends periodic echo packets that include the address of the sender as both the source address and the destination address, which causes the responder data plane to reflect the echo packets back to the sender. In either case, the responder data plane reflects the control packets and the echo packets sent by the sender back to the sender, without punting them to the responder control plane.

Figure 4:
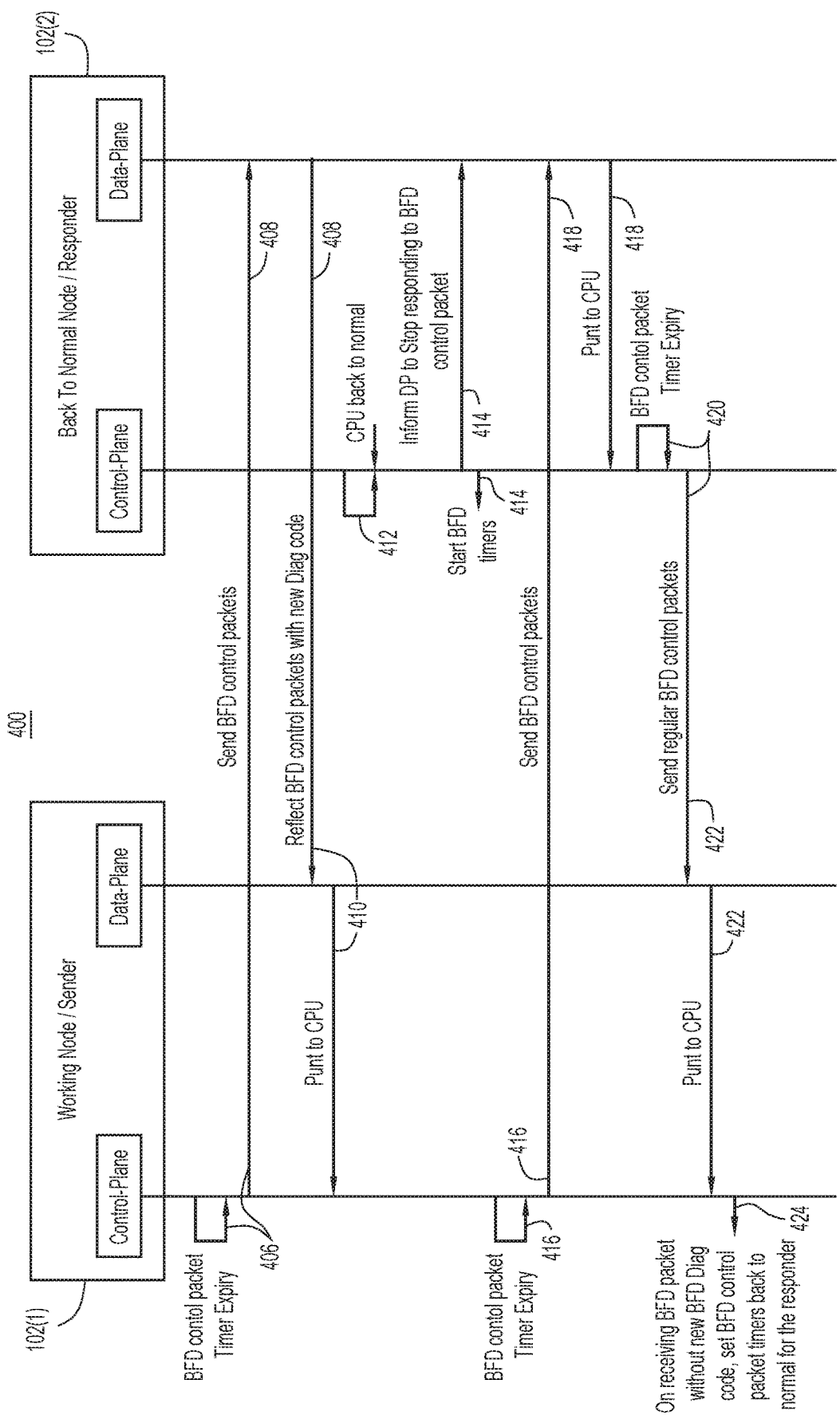
FIG. 4 is a transaction diagram of fallback operations of the improved BFD that occur after the event trigger-response operations of FIG. 3, according to an example embodiment.

With reference to FIG. 4, there is shown an example transaction diagram 400 of fallback operations of the improved OAM (e.g., improved BFD) that occur after or follow the event trigger-response operations of FIG. 3. Similar to transaction diagram 300, transaction diagram 400 shows BFD operations performed by, and BFD packet exchanges between, peer nodes 102(1) and 102(2).

The sequence of operations 406, 408, and 410 are similar to the sequence of operations 316, 318, and 320, described above, except as indicated. Specifically, at 406, the sender originates and sends periodic control packets to the responder responsive to expiry of the local BFD timer. The time interval of the local BFD timer may be extended relative to the time interval used at 316 due to operation 322, which may have extended the timer responsive to the critical condition diagnostic code. At 408, the responder data plane receives the control packets sent by the sender at 406, populates each control packet with the critical condition diagnostic code established at operation 312, and reflects the control packet (populated with the critical condition diagnostic code) back to the sender, without forwarding the control packet to the responder control plane. At 410, the sender data plane receives the reflected control packets from the responder, and punts the reflected control packets to the sender control plane.

Background operation 412 is similar background operation 312. At 412, concurrent with operations 406-410, the responder control plane monitors its own performance, e.g., the performance of local CPU and memory, for a return to normal. Based on the monitoring, the responder control plane detects that the control plane returns to normal, i.e., the critical condition previously detected is no longer present.

Responsive to detecting that the critical condition is cleared, at 414, the responder BFD session transitions from the reflector mode back to the normal mode. The responder BFD session configures the responder data plane for the normal mode, i.e., to (i) stop reflecting the control packets received from the sender back to the sender and stop populating the control packets with the critical condition diagnostic code, and (ii) start punting the control packets to the responder control plane. The responder BFD session also restarts its local BFD timers, which were previously stopped, such that periodic expiry of the timers will trigger the responder BFD session to originate and send periodic control packets to the sender.

Operation 416 at the sender is similar to operation 406. Specifically, at 416, the sender originates and sends periodic control packets to the responder responsive to expiry of the local BFD timer, with the extended time interval.

Operations 418 and 420 performed by the responder BFD session in the normal mode are essentially the same as operations 308 and 310 similarly performed by the responder BFD session in the normal mode. Specifically, at 418, the responder data plane receives the control packets and punts them to the responder control plane, which determines whether the sender is reachable based on the punted control packets. At 420, responsive to expiry of the local BFD timer, the responder BFD session originates and sends periodic control packets to the sender. The control packets include the diagnostic code that indicates there is no critical condition present at the responder.

At 422, the sender data plane receives the control plackets sent by the responder and punts them the sender control plane/BFD session. The sender BFD session recovers the diagnostic code from the control packets that indicates there is no longer a critical condition at the responder. Responsive to the control packets that no longer include the critical condition diagnostic code, and thus indicate the responder has returned to normal, at 424, the sender BFD session sets its local BFD timers back to a normal time interval, e.g., decreases the timer interval to the interval used in operation 306 prior to receipt of the critical condition diagnostic code reported by the responder.

It is understood that the responder operations and the sender operations described above are reciprocal. In other words, the responder may additionally perform the sender operations described above, and the sender may additionally perform the responder operations described above.

Figure 5:
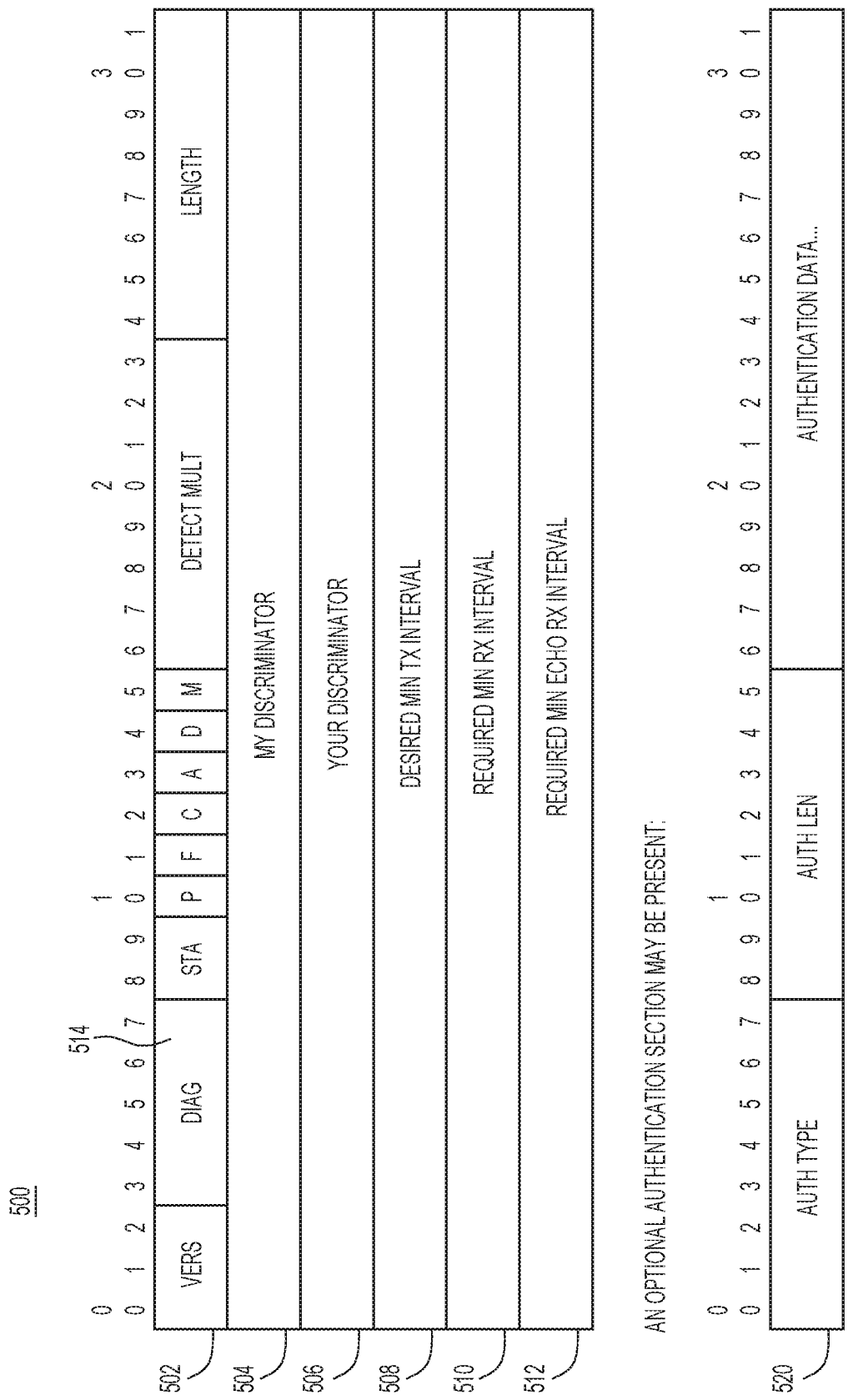
FIG. 5 is an illustration of a format of a BFD control packet, according to an example embodiment.

With reference to FIG. 5, there is an illustration of a format of an example BFD control packet 500. Control packet 500 includes multiple word fields 502-512. Word field 502 includes fields for a version, a multi-bit diagnostic code ("Diag") 514, flag fields Sta, P, F, C, A, D and M, and additional detection and length fields. The multi-bit diagnostic code (i.e., "code") may be populated with a value selected from a range of incrementing integer values, e.g., from 9 to 31, where 9 indicates there is no critical condition, and remaining values 10-31 indicate respective types of critical conditions, i.e., each value>9 indicates a specific type of critical condition among several different types of critical conditions that are possible. Fields 504, 506, 508, 510, and 512 are respectively populated with values for my discriminator, your discriminator, desired minimum transmit (TX) interval, required minimum receive (RX) interval, and required minimum echo receive interval. Control packet 500 may also include an optional authentication field 520.

Figure 6:
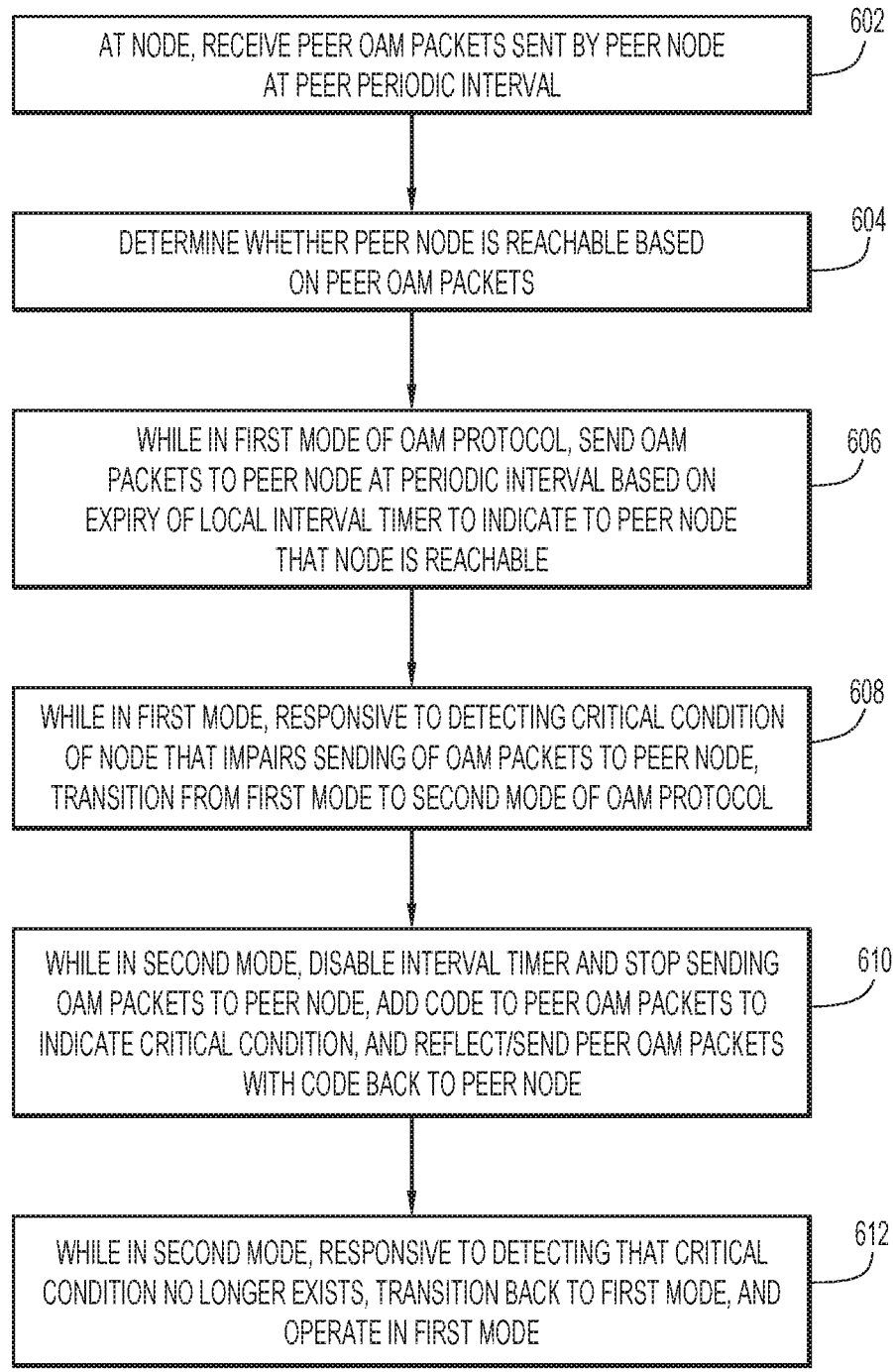
FIG. 6 is a flowchart of a method of using an event trigger to adapt interval timers and modes of the improved OAM protocol, according to an example embodiment.

With reference to FIG. 6, there is a flowchart of an example method 600 of using an event trigger to adapt interval timers and modes of a fast detecting OAM protocol (i.e., the improved OAM protocol), performed by a node (e.g., either of nodes 102) with respect to a peer or neighbor node connected to the node over a data link in a network. The event trigger includes detection of a critical condition at the node, as described herein. Method 600 includes operations described above. In a non-limiting example, the OAM protocol may be based on BFD, extended to include new features and to operate in accordance with the embodiments presented herein.

At 602, the node (e.g., responder node 102(2)) receives peer OAM packets (e.g., BFD control packets) sent by the peer node (e.g., sender node 102(1)) at a peer periodic interval set by the peer node. The peer OAM packets may include a code that indicates that the peer node is not in a critical condition.

At 604, the node determines whether the peer node is reachable based on the peer OAM packets.

At 606, while in a first mode (e.g., normal or default mode) of the OAM protocol, the node sends OAM packets (e.g., BFD control packets) to the peer node at a periodic interval based on expiry of an (OAM) interval timer, to indicate to the peer node that the node is reachable. The OAM packets include a code that indicates that the node is not in a critical condition.

At 608, while in the first mode, responsive to detecting a critical condition (e.g., the event trigger) of the node that impairs (e.g., would delay beyond an acceptable time interval) its sending of the periodic OAM packets to the peer node, the node transitions from the first mode to a second mode (e.g., a reflector mode) of the OAM protocol.

At 610, while in the second mode, the node disables the interval timer to cause the node to stop sending the OAM packets to the peer node, adds a diagnostic code to the peer OAM packets when received to indicate the critical condition, and reflects/sends the peer OAM packets populated with the diagnostic code back to the peer node. The diagnostic code is configured to cause the peer node to take an action based on the critical condition (e.g., back-off its local OAM interval timers), while the critical condition persists.

At 612, while in the second mode, responsive to detecting that the critical condition no longer exists, the node transitions back to the first mode and operates according to the first mode.

Figure 7:
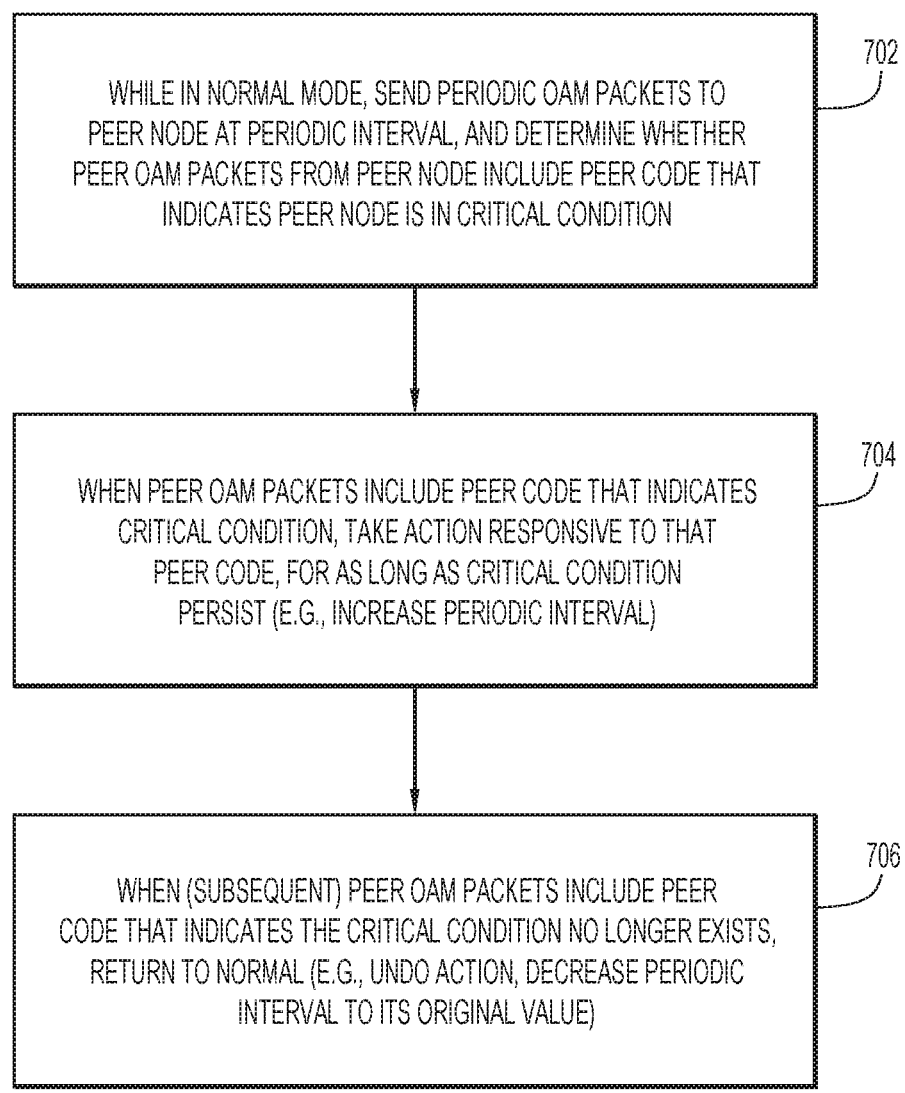
FIG. 7 is a flowchart of an additional method of using an event trigger to adapt interval timers and modes of the improved OAM protocol, according to an example embodiment.

With reference to FIG. 7, there is a flowchart of another example method 700 of using an event trigger to adapt interval timers and modes of the improved OAM protocol, performed by a node (e.g., either of nodes 102) with respect to a peer node connected to the node in a network.

At 702, while in a normal mode of the OAM protocol, the node sends periodic OAM packets to the peer node at a periodic interval responsive to periodic expiry of a local OAM timer. Also, the node receives peer OAM packets sent by the peer node, and determines whether the peer OAM packets include a peer code that indicates the peer node is in a critical condition.

At 704, when the peer OAM packets include the peer code that indicates the critical condition, the node takes action responsive to the peer code, for as long as the peer code that indicates the critical condition persists in the peer OAM packets. The action may include increasing the periodic time interval set by the local OAM timer to decrease a frequency at which the node sends its periodic OAM packets to the peer node.

At 706, when subsequently received peer OAM packets include a peer code that indicates that the critical condition at the peer no longer exists, the node returns to normal. For example, the node decreases the periodic time interval to its original value.

In summary, the embodiments provide protection to fast failure-detection OAM protocols (e.g., BFD, S-BFD, and SR-PM) in light of interruptions that would create false positives. For example, when the CPU predicts that there could be a CPU spike because of some event trigger, then it could inform the platform to respond to the received BFD control packet with a new diagnostic code.

A typical OAM software, such as a BFD session, runs point-to-point between peer nodes with 50 ms interval. If a first node (BFD sender) of the peer nodes does not receive BFD Hellos within 150 ms (3*50 ms) from a second node (BFD receiver) of the peer nodes, then the first node declares that the second node is not reachable. The reason that the first node may not receive the BFD Hellos from the second node may be that the second node is simply too busy performing a critical mission to service its local BFD timers to send its BFD Hellos, not because the second node is unreachable from a network link perspective. Accordingly, the embodiments presented herein perform the following operations:

a. The second node detects its busy/critical condition and the type of critical condition, i.e., the reason the second node is busy. The second node adaptively informs the first node of the critical condition and the type of critical condition.
  b. The first node adjusts its local BFD timer and its frequency based on the type of critical condition that is reported by the second node.
  c. Also, the second node may adaptively reflect the BFD Hellos from the first node in the second node dataplane statelessly, e.g., the dataplane reflects the BFD Hellos from the first node, and the second node dataplane adds to the reflected BFD Hellos a new BFD diagnostic code that indicates the critical condition, which results in informing the first node of the critical condition. Upon receipt of the diagnostic code, the first node decreases or alternatively increases the frequency of the BFD timer interval. Similarly, once the first and second nodes leave the critical condition/state, the BFD Hellos are punted to the control plane at the second node, where regular BFD validation is performed. Once back to normal, the second node does not send the BFD Hellos with the diagnostic code that indicates the critical condition.

In one aspect, a method is provided comprising: at a node in a network and configured to implement an Operation, Administration, and Maintenance (OAM) protocol for rapid link failure detection with respect to a peer node: receiving peer OAM packets sent by the peer node over a link at a peer periodic interval; while in a first mode of the OAM protocol: determining whether the peer node is reachable based on the peer OAM packets; sending OAM packets to the peer node at a periodic interval to indicate to the peer node that the node is reachable; and responsive to detecting a critical condition of the node that impairs the sending the OAM packets, transitioning to a second mode of the OAM protocol; and while in the second mode: adding, to the peer OAM packets, a code to indicate the critical condition; and reflecting the peer OAM packets with the code back to the peer node.

In another aspect, an apparatus is provided comprising: network ports to communicate with a network; and a processor coupled to the network ports and configured to implement, on a node, an Operation, Administration, and Maintenance (OAM) protocol for rapid link failure detection with respect to a peer node in the network, the processor further configured to perform: receiving peer OAM packets sent by the peer node over a link at a peer periodic interval; while in a first mode of the OAM protocol: determining whether the peer node is reachable based on the peer OAM packets; sending OAM packets to the peer node at a periodic interval to indicate to the peer node that the node is reachable; and responsive to detecting a critical condition of the node that impairs the sending the OAM packets, transitioning to a second mode of the OAM protocol; and while in the second mode: adding, to the peer OAM packets, a code to indicate the critical condition; and reflecting the peer OAM packets with the code back to the peer node.

In yet another aspect, a non-transitory compute readable medium is provided. The medium is encoded with instructions that, when executed by a processor of a node configured to implement an Operation, Administration, and Maintenance (OAM) protocol for rapid link failure detection with respect to a peer node in a network, cause the processor to perform: receiving peer OAM packets sent by the peer node over a link at a peer periodic interval; while in a first mode of the OAM protocol: determining whether the peer node is reachable based on the peer OAM packets; sending OAM packets to the peer node at a periodic interval to indicate to the peer node that the node is reachable; and responsive to detecting a critical condition of the node that impairs the sending the OAM packets, transitioning to a second mode of the OAM protocol; and while in the second mode: adding, to the peer OAM packets, a code to indicate the critical condition; and reflecting the peer OAM packets with the code back to the peer node.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a node in a network and configured to implement an Operation, Administration, and Maintenance (OAM) protocol for rapid link failure detection with respect to a peer node:
receiving peer OAM packets sent by the peer node over a link at a peer periodic interval;
while in a first mode that is an asynchronous mode of the OAM protocol:
determining whether the peer node is reachable based on the peer OAM packets;
sending OAM packets to the peer node at a periodic interval responsive to periodic expiry of an interval timer to indicate to the peer node that the node is reachable; and
responsive to detecting a critical condition of the node that (i) is unrelated to reachability of the peer node over the link, and (ii) would cause the node to delay beyond an acceptable time interval sending the OAM packets, transitioning to a second mode that is an echo mode of the OAM protocol; and
while in the second mode:
stopping the interval timer and not sending the OAM packets to the peer node at the periodic interval;
adding, to the peer OAM packets, a code to indicate the critical condition; and
reflecting the peer OAM packets with the code back to the peer node to avoid triggering a false alarm of peer unreachability at the peer node.

2. The method of claim 1, wherein the code is configured to cause the peer node to take an action based on the code while the critical condition persists.

3. The method of claim 1, further comprising:
while in the first mode, not reflecting the peer OAM packets back to the peer node.

4. The method of claim 1, wherein:
the critical condition includes one of central processing unit (CPU) usage above a CPU threshold, memory usage above a memory threshold, and a routing protocol crash.

5. The method of claim 1, wherein:
the code is part of a multi-bit diagnostic code populated with values to indicate a type of the critical condition.

6. The method of claim 1, further comprising:
while in the second mode, responsive to detecting the critical condition no longer exists, transitioning back to the first mode.

7. The method of claim 1, wherein detecting includes detecting that a processor of the node exceeds a processor usage threshold or a memory of the node exceeds a memory usage threshold.

8. The method of claim 1, wherein:
the node includes a control plane to implement the OAM protocol and to implement a routing protocol with which the OAM protocol communicates; and
detecting includes, by the control plane, detecting the critical condition.

9. The method of claim 8, wherein:
the node includes a data plane to perform packet forwarding;
sending includes, by the control plane, sending the OAM packets to the peer node via the data plane; and
receiving includes, by the control plane, receiving the peer OAM packets from the peer node via the data plane.

10. The method of claim 9, further comprising, while in the second mode, by the control plane:
configuring the data plane to perform reflecting the peer OAM packets without sending the peer OAM packets to the control plane; and
halting sending the OAM packets.

11. The method of claim 1, further comprising:
while in the first mode, determining whether the peer OAM packets include a peer code that indicates the peer node is in a peer node critical condition; and
when the peer OAM packets include the peer code, taking an action responsive to the peer code.

12. The method of claim 11, wherein taking the action includes one or more of:
increasing or decreasing the periodic interval; and
including in the OAM packets a destination address that is an address of the node to cause the peer node to, upon receiving the OAM packets from the node, echo the OAM packets back to the node.

13. The method of claim 1, wherein the OAM protocol is based on a bidirectional forwarding detection (BFD) protocol.

14. An apparatus comprising:
network ports to communicate with a network; and
a processor coupled to the network ports and configured to implement, on a node, an Operation, Administration, and Maintenance (OAM) protocol for rapid link failure detection with respect to a peer node in the network, the processor further configured to perform:
receiving peer OAM packets sent by the peer node over a link at a peer periodic interval;
while in a first mode that is an asynchronous mode of the OAM protocol:
determining whether the peer node is reachable based on the peer OAM packets;
sending OAM packets to the peer node at a periodic interval responsive to periodic expiry of an interval timer to indicate to the peer node that the node is reachable; and
responsive to detecting a critical condition of the node that (i) is unrelated to reachability of the peer node over the link, and (ii) would cause the node to delay beyond an acceptable time interval sending the OAM packets, transitioning to a second mode that is an echo mode of the OAM protocol; and
while in the second mode:
stopping the interval timer and not sending the OAM packets to the peer node at the periodic interval;
adding, to the peer OAM packets, a code to indicate the critical condition; and
reflecting the peer OAM packets with the code back to the peer node to avoid triggering a false alarm of peer unreachability at the peer node.

15. The apparatus of claim 14, wherein the code is configured to cause the peer node to take an action based on the code while the critical condition persists.

16. The apparatus of claim 14, wherein the processor is further configured to perform:
while in the first mode, not reflecting the peer OAM packets back to the peer node.

17. The apparatus of claim 14, wherein:
the critical condition includes one of central processing unit (CPU) usage above a CPU threshold, memory usage above a memory threshold, and a routing protocol crash.

18. A non-transitory computer readable medium encoded with instructions that, when executed by a processor of a node configured to implement an Operation, Administration, and Maintenance (OAM) protocol for rapid link failure detection with respect to a peer node in a network, cause the processor to perform:
receiving peer OAM packets sent by the peer node over a link at a peer periodic interval;
while in a first mode that is an asynchronous mode of the OAM protocol:
determining whether the peer node is reachable based on the peer OAM packets;
sending OAM packets to the peer node at a periodic interval responsive to periodic expiry of an interval timer to indicate to the peer node that the node is reachable; and
responsive to detecting a critical condition of the node that (i) is unrelated to reachability of the peer node over the link, and (ii) would cause the node to delay beyond an acceptable time interval sending the OAM packets, transitioning to a second mode that is an echo mode of the OAM protocol; and
while in the second mode:
stopping the interval timer and not sending the OAM packets to the peer node at the periodic interval;
adding, to the peer OAM packets, a code to indicate the critical condition; and
reflecting the peer OAM packets with the code back to the peer node to avoid triggering a false alarm of peer unreachability at the peer node.

19. The non-transitory computer readable medium of claim 18, wherein the code is configured to cause the peer node to take an action based on the code while the critical condition persists.

20. The non-transitory computer readable medium of claim 18, further comprising instructions to cause the processor to perform:
while in the first mode, not reflecting the peer OAM packets back to the peer node.

* * * * *